United States Patent [19]
Tominaga

[11] Patent Number: 6,153,042
[45] Date of Patent: Nov. 28, 2000

[54] LABEL REMOVING METHOD AND APPARATUS

[75] Inventor: Yoshihiro Tominaga, Kanagawa, Japan

[73] Assignee: Fuji Photo Film Co., Ltd., Kanagawa, Japan

[21] Appl. No.: 09/190,139

[22] Filed: Nov. 12, 1998

[30] Foreign Application Priority Data

Nov. 12, 1997 [JP] Japan ................................... 9-310675

[51] Int. Cl.⁷ .................................................. B32B 35/00
[52] U.S. Cl. ............................ 156/344; 156/584; 83/27; 83/102; 83/420; 83/433
[58] Field of Search ................................... 156/344, 584; 83/27, 100, 102, 420, 425, 433, 946

[56] References Cited

U.S. PATENT DOCUMENTS

| | | | |
|---|---|---|---|
| 3,750,504 | 8/1973 | Sidler | 83/100 X |
| 3,889,442 | 6/1975 | Grahn et al. | 53/492 |
| 4,717,442 | 1/1988 | Hopson | 156/584 |
| 4,834,826 | 5/1989 | Abe et al. | 156/584 X |
| 5,372,672 | 12/1994 | Seifert et al. | 156/584 |
| 5,442,851 | 8/1995 | Lerner et al. | 156/584 X |
| 5,685,053 | 11/1997 | Deonarine et al. | 156/584 X |
| 5,725,349 | 3/1998 | Garvey et al. | 83/946 |
| 5,758,362 | 6/1998 | Focke et al. | 83/100 X |
| 5,885,401 | 3/1999 | Eiban | 156/584 X |
| 5,933,658 | 6/1998 | Ichino et al. | 396/6 |

FOREIGN PATENT DOCUMENTS

| | | |
|---|---|---|
| 6-106150 | 4/1994 | Japan . |
| 9-54399 | 2/1997 | Japan . |

*Primary Examiner*—Mark A. Osele
*Attorney, Agent, or Firm*—Sughrue, Mion, Zinn, Macpeak & Seas, PLLC

[57] ABSTRACT

A lens-fitted photo film unit has a housing and a label, which is wound about the housing in a belt-shape, and at least partially adhered to the housing. To remove the label from the housing, the label is cut in a predetermined cutting direction crosswise to a winding direction of the label. First and second cut ends are formed on the label. The first cut end is pushed open away from the housing. After this, the first cut end is pulled away from the housing, so that the label is peeled from the housing.

31 Claims, 7 Drawing Sheets

LABEL REMOVING METHOD AND APPARATUS

BACKGROUND OF THE INVENTION

1. Field of the Invention

The present invention relates to a label removing method and apparatus. More particularly, the present invention relates to a label removing method and apparatus for removal of a label which is wound about an article in a belt-shape and adhered to the article.

2. Description Related to the Prior Art

A vessel or an article formed from plastic material or glass is provided with a label in various manners. There is a labeling structure in which a label has a front surface printed with patterns and information, and a back surface coated with adhesive agent, and is wound about the center of the article in a manner one distal end of the label is overlapped on the other. In comparison with a packaging structure covering the article in a box made by bending a cardboard, the labeling structure is advantageous in the small amount of the covering material in use, and thus a reduced packaging cost. Also the labeling structure can reduce the size of the covered shape of the material, to reduce its space required in stores where a great numbers of bottles or the like are displayed commercially. The vessel or article after being used is withdrawn collectively by dealers or manufacturers in consideration of effective use of limited resource, and protection of environment. After the label is peeled, the article is crushed and pelleted to be reused as raw material. If the article is safe without damages, it is provided with a new label and recycled.

There is a method in which chemical material is applied to the label for the purpose of peeling from the article. However the chemical material is solvent which damages the article and is harmful to its quality, no matter how reliably the label can be peeled from the article. Thus there are suggestions of peeling a label effectively without use of harmful chemicals. U.S. Pat. No. 5,372,672 (corresponding to JP-A 6-106150) and U.S. Pat. No. 5,933,658 (corresponding to JP-A 9-54399) as a commonly assigned patent application suggest a method and an apparatus in which a label about an article is cut to form a cut end, and then the cut end is captured to peel the label from the article.

But the structures of those prior documents have various shortcomings. One end of the label is cut straight. The extremely small cut end is chucked and captured before the label is peeled from the article. It is likely that the label is broken at the captured end in the course of the peeling operation. Or the captured end is likely to drop away from the capturing tool. Failure is likely to occur in capturing the cut end. Therefore the reliability in the label peeling is considerably low. Furthermore a tool for capturing the cut end of the label must be positioned with extremely high precision for the purpose of the small cut end minutely peeled from the article. The problem lies in that the positioning of the article requires much time, and is inconsistent to good efficiency in the operation.

SUMMARY OF THE INVENTION

In view of the foregoing problems, an object of the present invention is to provide a label removing method and apparatus in which a label can be easily peeled from an article efficiently, by creating a label portion to be chucked reliably.

In order to achieve the above and other objects and advantages of this invention, a label is wound about an article in a belt-shape, and at least partially adhered to the article. To remove the label from the article, the label is cut in a predetermined cutting direction crosswise to a winding direction of the label, to form first and second cut ends on the label. The first cut end is pushed open away from the article. After the first cut end is pushed open, the first cut end and the article are moved relative to one another, so as to peel the label from the article.

In a preferred embodiment, the article is a housing of a lens-fitted photo film unit (i.e., a camera).

In a label removing apparatus, a cutter cuts the label in a predetermined cutting direction crosswise to a winding direction of the label, to form first and second cut ends on the label. A spreader is disposed to be offset rearwards from the cutter in the cutting direction, and to protrude in the winding direction from the cutter, for pushing open the first cut end away from the article. A peeler moves the first cut end and the article relative to one another after the first cut end is pushed open, so as to peel the label from the article.

A conveyor conveys the article in the cutting direction relative to the cutter, so as to cut the label.

The cutter and the spreader are constituted by a single knife blade. The knife blade further includes a shank portion disposed to extend rearwards from the spreader in the cutting direction, at least the shank portion in the knife blade being flexed by the article when the cutter is pressed against the article.

The cutter includes an advancing end, which is narrow, for passing between the label and the article in an advance position. A cutting portion is disposed to extend rearwards from the advancing end in the cutting direction, and to protrude opposite to the spreader in the winding direction, and has an inclined edge inclined relative to the cutting direction, for cutting the label in a cutting position, the cutting position being offset from the advance position.

The article includes a substantially straight groove, formed to extend in the cutting direction, disposed in the advance position, for receiving insertion of the advancing end, to facilitate cutting of the label.

The peeler includes a chuck for capturing the first cut end, and for moving away from the article.

Also the peeler includes a pusher member for pushing the first cut end away from the article in the winding direction.

By this construction, the label can be easily peeled from the article efficiently.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
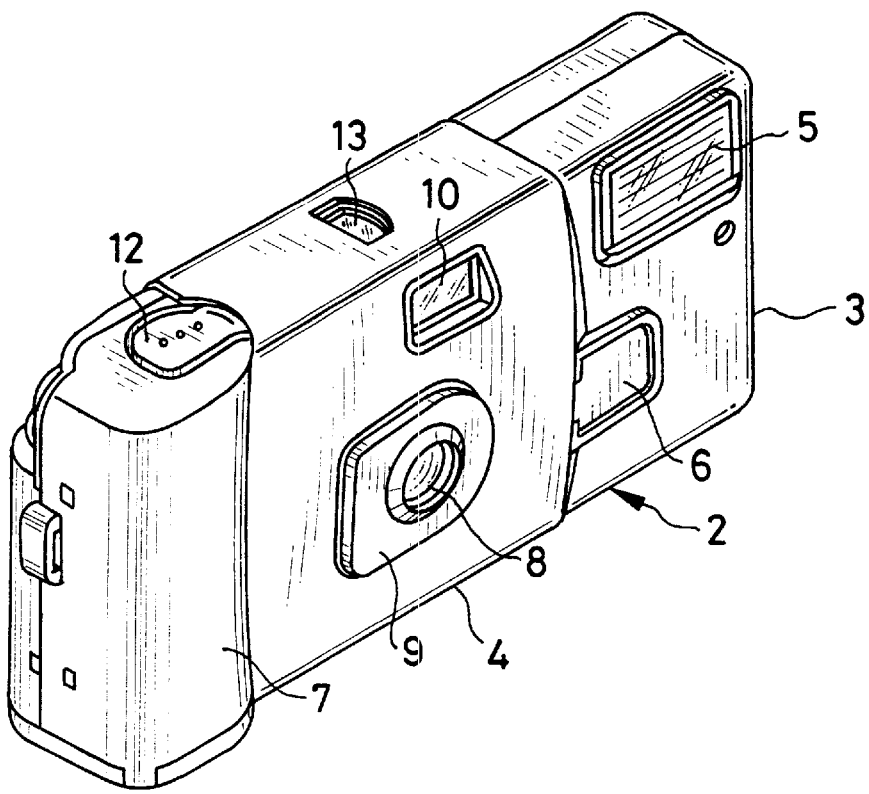
FIG. 1 is a front perspective illustrating a lens-fitted photo film unit.
Figure 2:
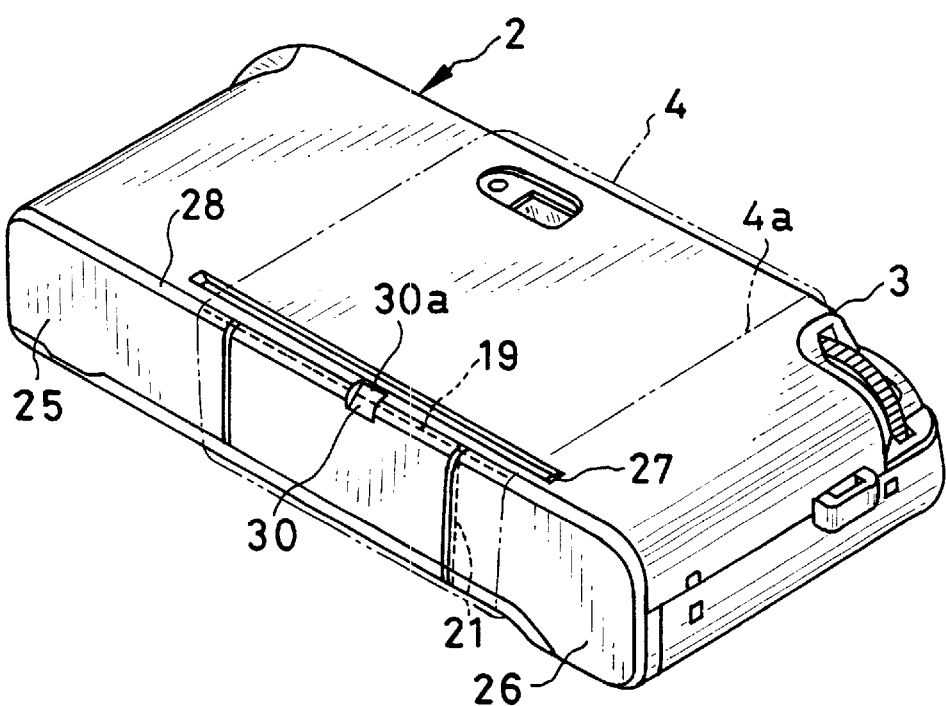
FIG. 2 is a rear perspective illustrating the lens-fitted photo film unit.

In FIGS. 1 and 2, a lens-fitted photo film unit 2 is depicted. The lens-fitted photo film unit 2 is constituted of a housing 3 and a label or sticker 4. The housing 3 accommodates a mechanism for taking an exposure, and is preloaded with photo film. The housing 3 constitutes an article to be unwrapped in the present invention, and has a shape of a rectangular parallelepipedic prism. The label 4 is attached to the housing 3, and has a printed decorative pattern. Adhesive agent is applied to the whole or edges of the back surface of the label 4, to attach the label 4 to the housing 3. The label 4 is wound a bout the center of the housing 3 in a belt shape.

The label 4 is formed from paper or a thin plastic sheet. Of course any of suitable materials may be selected as desired in the form of the label 4 as a thin sheet.

The inside of the housing 3 has a cassette holder chamber (not shown) and a roll chamber (not shown). The cassette holder chamber contains a cassette shell of a photo film cassette. The roll chamber contains a roll of photo film, which is drawn out of the cassette shell. In FIG. 1, a left portion of the front of the housing 3 has a grip 7, which is shaped to cover the curved shape of the front of the cassette holder chamber containing the cassette shell. The right portion of the front of the housing 3 has a flash emitter window 5 and a flash charger button 6, which is depressible to start charging of a flash device.

In the center of the housing 3, there are a projecting portion 9 and a viewfinder window 10. The projecting portion 9 is so shaped as to cover internal elements including the shutter mechanism and a taking lens 8. A shutter button 12 is formed on the top of the housing 3. A counter window 13 is formed to keep a part of a counter disk (not shown) uncovered for indicating the number of remaining available frames of the photo film. The label 4 has a number of openings, through which the viewfinder window 10, the counter window 13 and the like appear externally.

Figure 3:
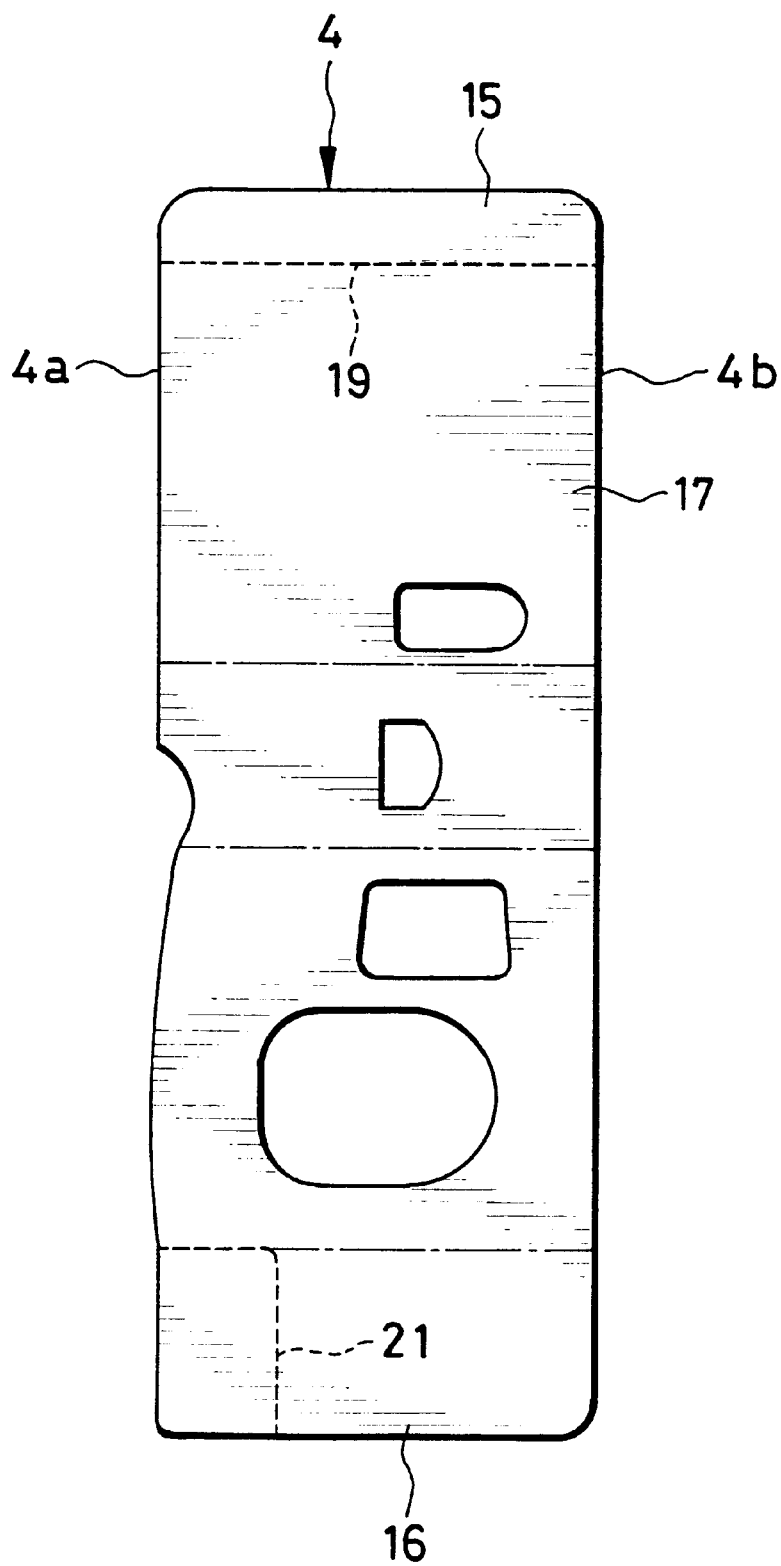
FIG. 3 is a plan illustrating a label of the lens-fitted photo film unit.

In FIG. 3, an outer surface of the label 4 is depicted. The label 4 has the openings for the projecting portion 9 and the viewfinder window 10. An overlapping portion 15 is disposed on one end of the label 4. A bottom portion 16 is disposed on a remaining end of the label 4 to cover a bottom face of the housing 3. When the label 4 is wound about the center of the housing 3 via the adhesive agent, the bottom portion 16 is overlapped on the overlapping portion 15 on the bottom face of the housing 3, and attached to it with the adhesive agent.

A rear portion 17 is used to cover the rear of the housing 3. There is a perforation train 19 disposed along a border between the rear portion 17 and the overlapping portion 15 for the purpose of label removal. The perforation train 19 defines a predetermined cutting direction. The perforation train 19 extends in the width direction of the spread shape of the label 4, from its one lateral edge 4a to the other lateral edge 4b. Note that a perforation train 21 is also formed for the purpose of opening a bottom lid 26 for the purpose of removal of a photo film cassette from the housing 3.

In FIG. 2, the bottom face of the lens-fitted photo film unit is depicted. The label 4 is indicated by the phantom line. A bottom lid 25 closes the roll chamber light-tightly. The bottom lid 26 closes the cassette holder chamber light-tightly. Both of the bottom lids 25 and 26 are partially covered by the label 4, and prevented from opening incidentally.

In the rear of the housing 3, there is a straight groove 27 disposed near to a bottom side of the rear. The straight groove 27 extends in the width direction of the label 4. The center of the straight groove 27 is covered by the label 4 with its both ends exposed beside the label 4. The straight groove 27 operates for ensuring insertion of a knife blade 36 between the housing 3 and the label 4 to facilitating removal of the label.

One longer side 28 of the housing 3 defined between its rear face and bottom face is provided with a notch 30, for the purpose of peeling the label. The notch 30 has a notch bottom face 30a, which is inclined to decrease a depth in a direction perpendicular to the perforation train 19.

When all frames of the photo film are exposed and all the photo film is contained in the cassette, the lens-fitted photo film unit 2 is forwarded to a photo laboratory without being disassembled. In the photo laboratory, the bottom lid 26 is opened to remove the photo film cassette, to subject the photo film to photofinishing operation of development and printing. The lens-fitted photo film unit 2 from which the photo film cassette is removed is withdrawn by a manufacturer having produced it originally. In a factory of the manufacturer, the label 4 is removed from the housing 3 by the removing operation, which will be described later. The housing 3 without the label 4 is disassembled into various parts, which are inspected in various aspects. Parts, which are determined acceptable, are reused as parts of new lens-fitted photo film units. Parts, which are determined unacceptable, are crushed, pelleted and melted, to be used for raw material for new lens-fitted photo film units.

Figure 4:
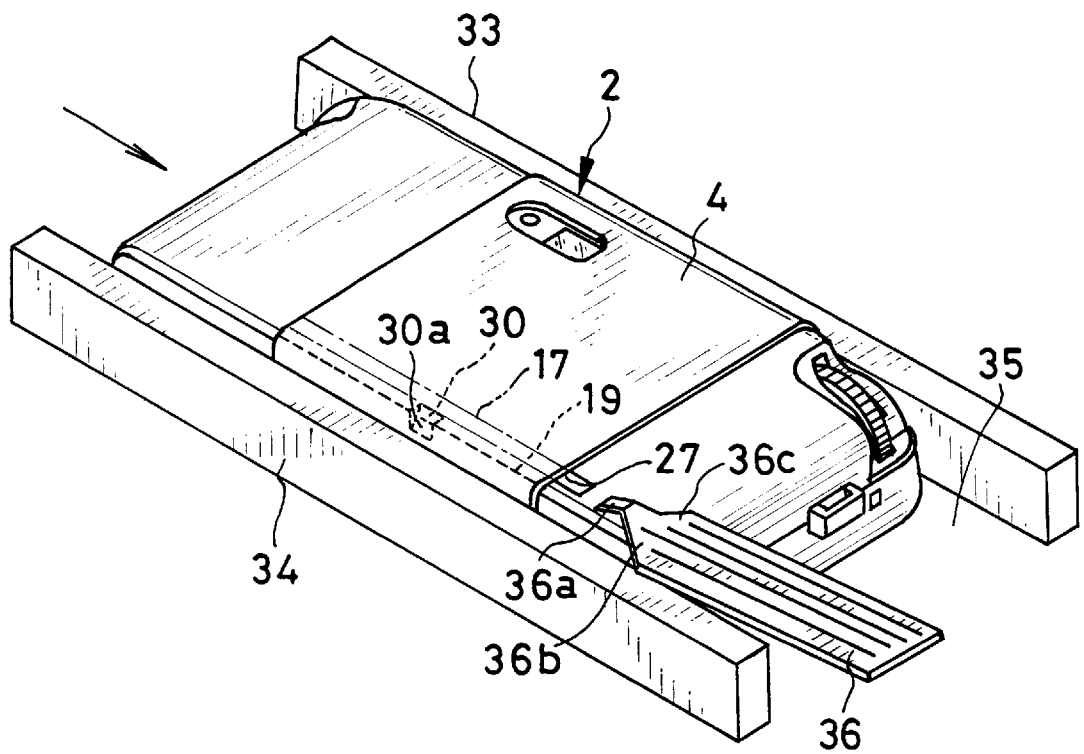
FIG. 4 is a rear perspective illustrating the lens-fitted photo film unit with a knife blade and a passageway for peeling.

A construction suitable for peeling the label 4 from the housing 3 is now described. In FIG. 4, the label is being cut in its width direction. There are guide rails 33 and 34, between which a passageway 35 is defined for conveying the lens-fitted photo film unit 2 being used in the arrow direction. The knife blade 36 is disposed in a position along the passageway 35, for cutting the perforation train 19 while the lens-fitted photo film unit 2 is conveyed, and for pushing open the label 4 away from the housing 3 at a small width along the perforation train 19. The knife blade 36 is secured to a shifter 51, and shifted up and down in the position of the lens-fitted photo film unit 2.

Figure 5:
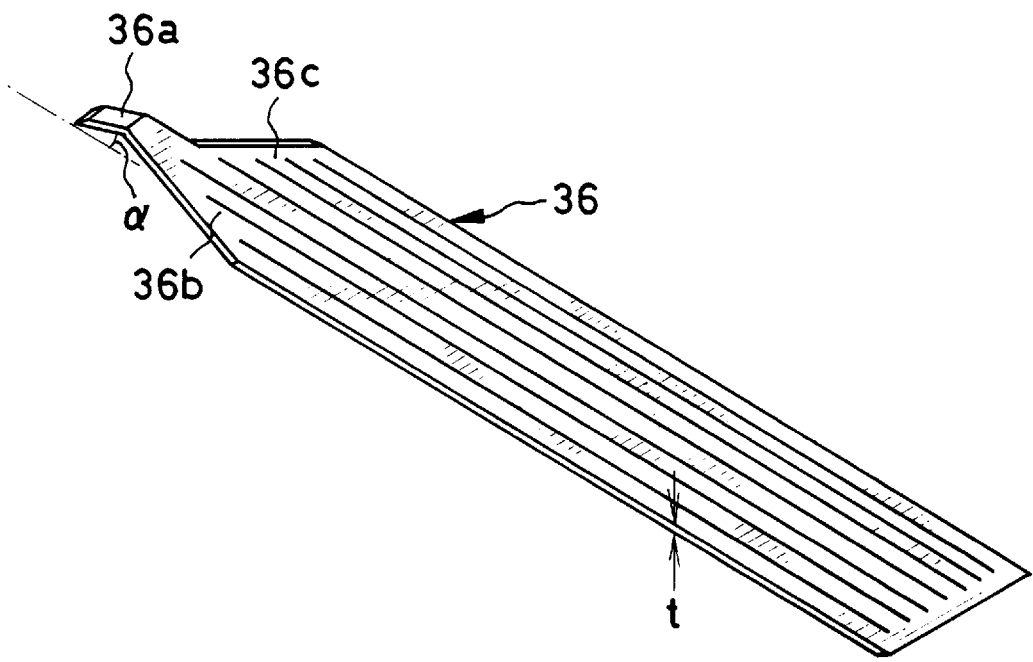
FIG. 5 is a perspective illustrating the knife blade.

In FIG. 5, the knife blade 36 includes an advancing end 36a, a cutting portion 36b, and a spreader 36c. The advancing end 36a is bent, and caused to enter the straight groove 27. The cutting portion 36b cuts the label 4 along the perforation train 19. The spreader 36c, after the cutting operation of the cutting portion 36b, shifts away the cut ends of the label 4 from the housing 3 to a predetermined small amount, for the purpose of causing one of the cut ends to be captured by a chuck of a label peeler device, which will be described later. The advancing end 36a has a bend angle α of 5–10°. The knife blade 36 has a thickness t of approximately 0.5 mm.

The knife blade 36 consists of a flexible resilient plate with a small thickness, for example SUB steel (spring steel), SK steel or the like. A surface of the knife blade 36 is provided with a great number of narrow grooves in the longitudinal direction of the knife blade 36, in order to avoid cutting errors by preventing itself from being stuck on the adhesive-coated surface of the label 4 in the course of cutting the label 4. Note that the surface of the knife blade 36 can be smoothly finished for the purpose of reliable avoidance of such cutting errors. For example, the knife blade 36 may be coated with teflon, or provided with minute patterns of projections or recesses. Moreover surface active agent may be applied to the surface of the knife blade 36 to reduce resistance.

Figure 6A:
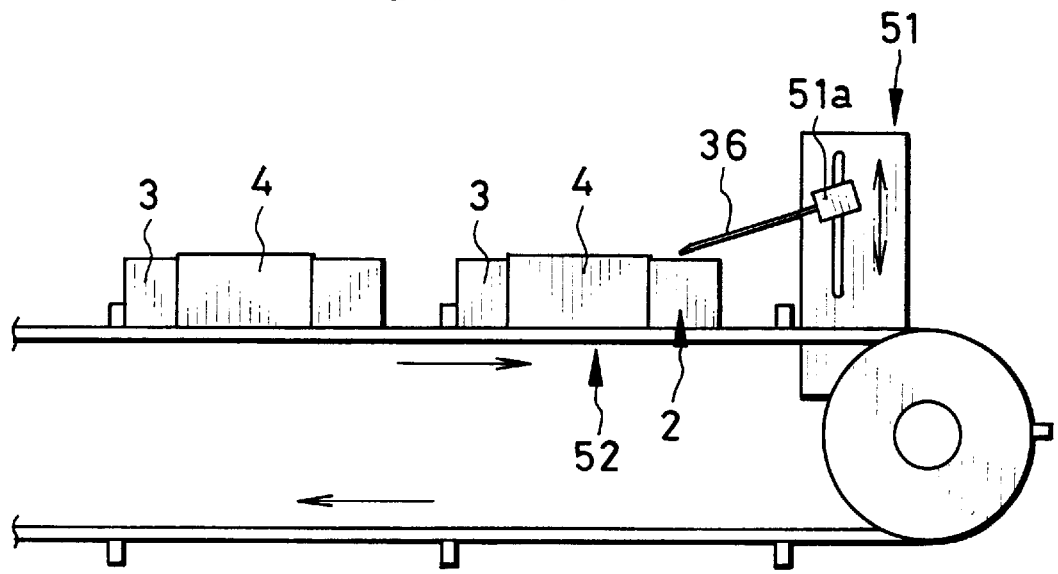
FIG. 6A is an explanatory view in elevation, illustrating a label peeling apparatus.
Figure 6B:
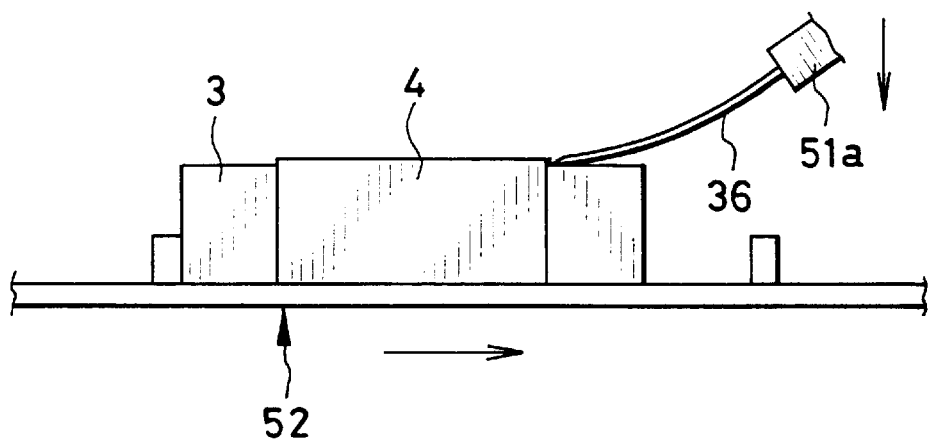
FIG. 6B is an explanatory view in elevation, illustrating a state of the label peeling apparatus where the knife blade is about to cut the label.
Figure 6C:
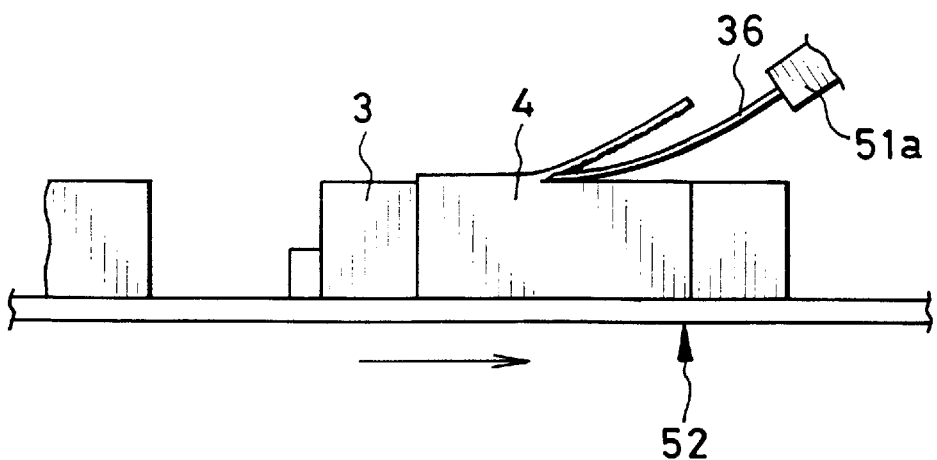
FIG. 6C is an explanatory view in elevation, illustrating a state where the knife blade is cutting the label.

In FIGS. 6A–6C, the lens-fitted photo film unit 2 is placed on a conveyor 52. When the lens-fitted photo film unit 2 is conveyed through the passageway 35 in the arrow direction of FIG. 4 to come near to the shifter 51, a chuck 51a with the knife blade 36 comes down, so that the knife blade 36 is pressed against the rear of the housing 3, and flexed resiliently. See FIG. 6B.

Figure 7:
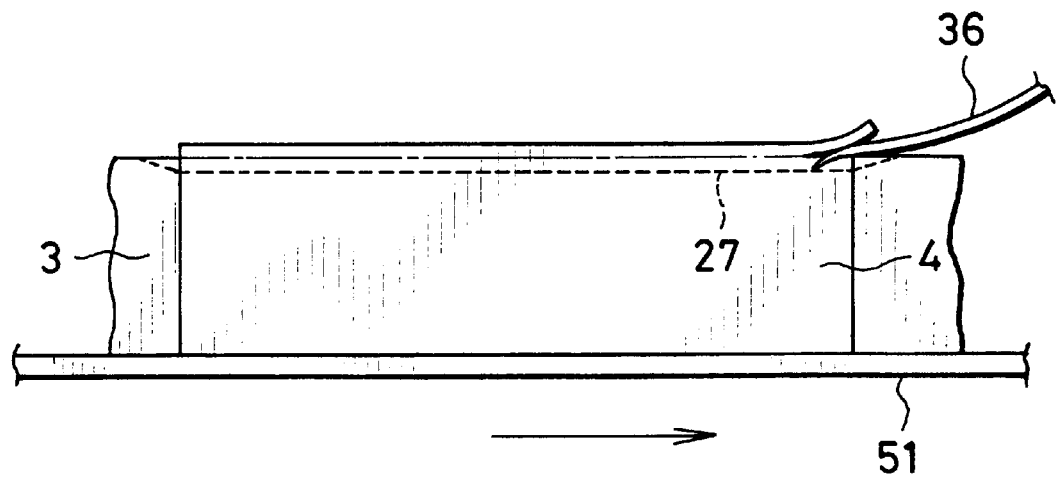
FIG. 7 is a side elevation, partially broken, illustrating a relationship between the knife blade and the lens-fitted photo film unit having a straight groove.

Then the advancing end 36a of the knife blade 36 enters the straight groove 27 as depicted in FIGS. 6C and 7. The lens-fitted photo film unit 2 is further conveyed by the conveyor 52, so that the cutting portion 36b of the knife blade 36 cuts the label 4 along the perforation train 19. The spreader 36c peels the label 4 at a regular width from the housing 3, to form a cut end 17a of the label 4. See FIG. 8.

Figure 8:
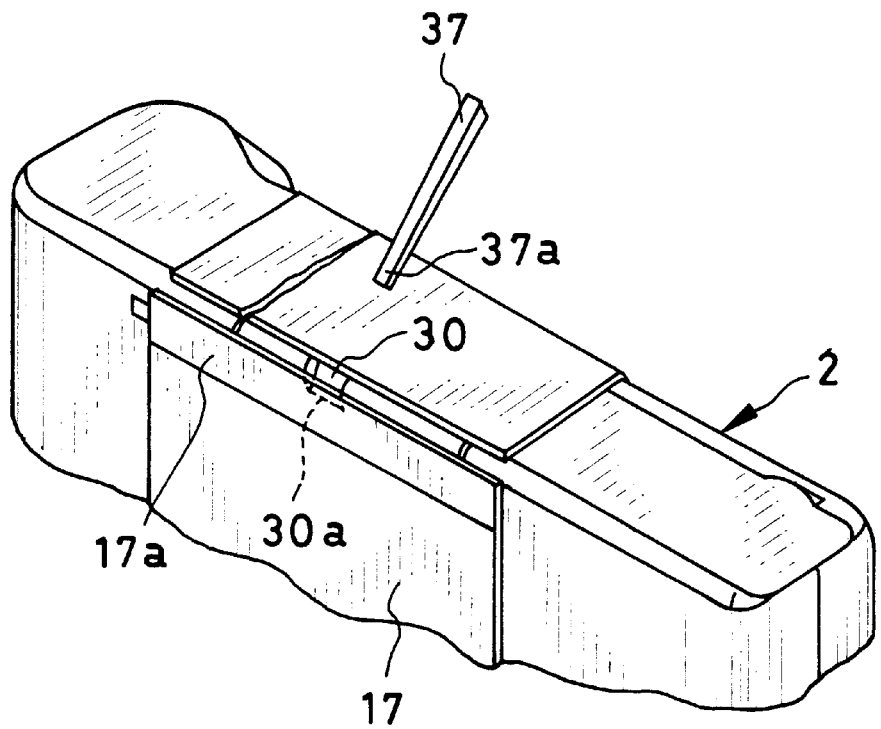
FIG. 8 is an explanatory view in perspective, illustrating a relationship between a pusher member and a cut end of the label.

In FIG. 8, one preferred embodiment for peeling the label is depicted. A pusher member 37 of a peeler in a stick shape is inserted into the notch 30 in contact with the notch bottom face 30a. A pusher end 37a of the pusher member 37 pushes a back surface of the rear portion 17. Consequently the pusher member 37 presses and peels the cut end 17a having been moved away from the housing 3 by the spreader 36c to the small extent.

Of course any suitable structure may be used for turning up the cut end 17a. For example, compressed air may be applied to the back surface of the cut end 17a to move it away from the housing 3. A plate-shaped guide member, a roller or any device may be pressed against the cut end 17a to provide the cut end 17a with an inclination of being turned up away from the housing 3. Furthermore a compressor of air may be used to suck the surface of the label 4 to turn up the cut end 17a away from the housing 3.

Figure 9:
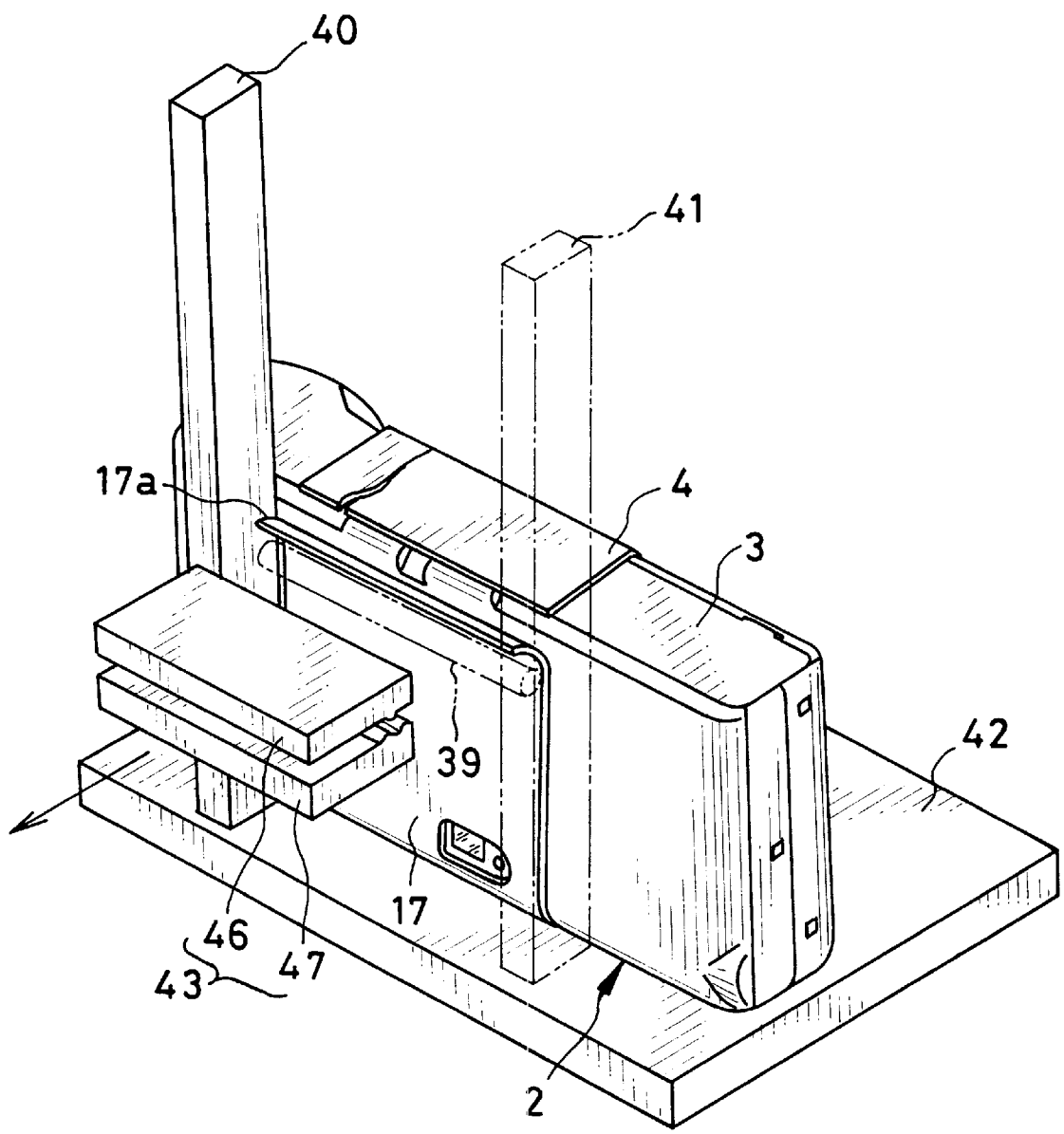
FIG. 9 is an explanatory view in perspective, illustrating the lens-fitted photo film unit, a peeler chuck, and its relevant construction.

In FIG. 9, another preferred embodiment for peeling the label is depicted. A label peeler device is constituted by a pair of wall members 40 and 41, a support tray 42 and a peeler chuck 43. The wall members 40 and 41 are disposed erectly on the support tray 42 at an interval which is greater than a width of the label 4 and smaller than a range of the housing 3 in the width direction of the label 4.

The peeler chuck 43 captures the cut end 17a, and moves in the arrow direction to pull it from between the wall members 40 and 41. The peeler chuck 43 is constituted by plates 46 and 47. The housing 3 is pulled to the wall members 40 and 41 when the peeler chuck 43 is moved. The wall members 40 and 41 keep the housing 3 from moving together with the peeler chuck 43. Pulling force of the peeler chuck 43 causes the housing 3 to turn in contact with the wall members 40 and 41, so as to peel the label 4 from the housing 3.

When the housing 3 is turned, the housing 3 is forcibly rubbed on the wall members 40 and 41. Accordingly the wall members 40 and 41 are provided with smooth surfaces having low friction to contact the housing 3, for the purpose of reducing friction between the housing 3 and the wall members 40 and 41. It is possible to turn t h e housing 3 at high speed and smoothly, and prevent the housing 3 from being ground, damaged, and the label 4 from being broken.

To avoid twisting the label 4 in the course of the peeling operation, a horizontally arranged guide rod 39 can be used between the wall members 40 and 41. The cut end 17a is moved in contact with the guide rod 39 by the peeler chuck 43, so that the label 4 is transferred while supported on the guide rod 39. The label 4 is kept regular without being entangled.

Figure 10A:
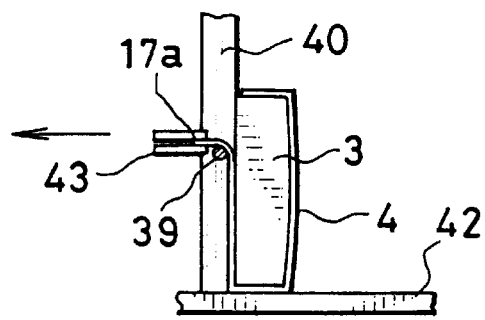
FIG. 10A is an explanatory view in elevation, illustrating a state where the peeler chuck initially chucks the cut end.
Figure 10B:
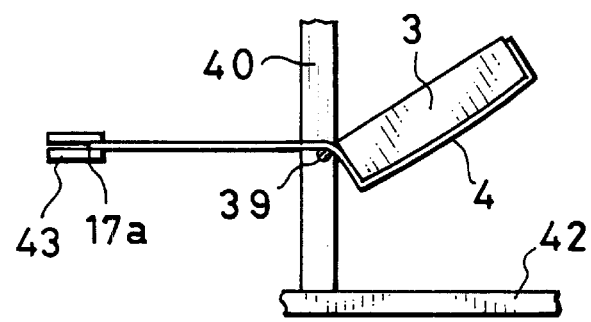
FIGS. 10B and 10C are explanatory views in elevation, illustrating states where the peeler chuck is peeling the label.
Figure 10C:
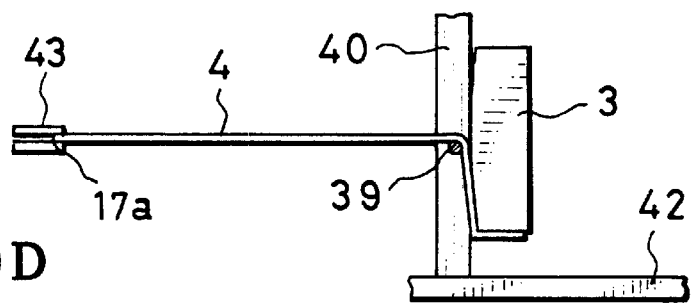
Figure 10D:
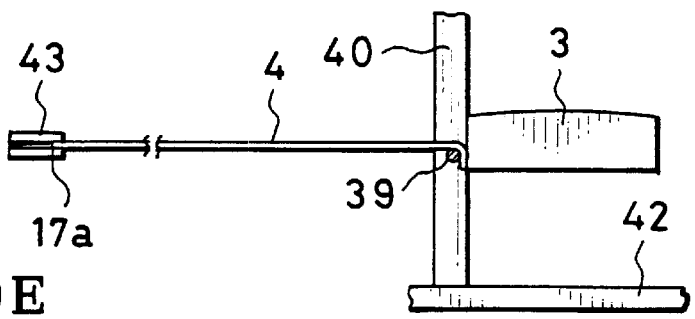
FIG. 10D is an explanatory view in elevation, illustrating a state of the finish of the label peeling.
Figure 10E:
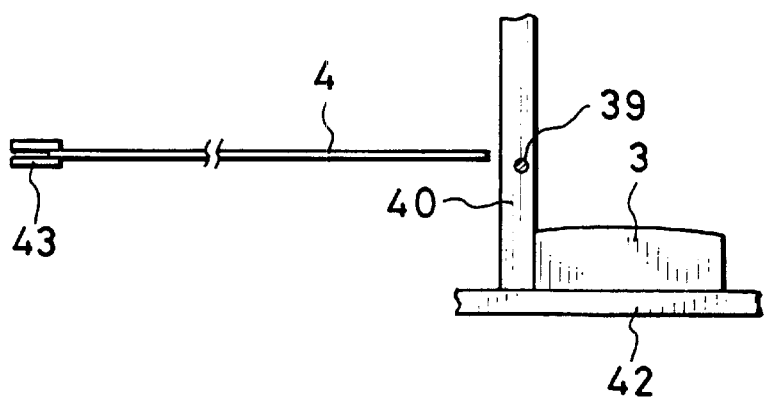
FIG. 10E is an explanatory view in elevation, illustrating a state where the chuck finally separates the label from a housing of the lens-fitted photo film unit.

Operation of peeling the label 4 from the housing 3 is described now. The lens-fitted photo film unit 2 is placed on the support tray 42. The peeler chuck 43 captures the cut end 17a between the wall members 40 and 41 as depicted in FIG. 10A. Then the peeler chuck 43 is moved in the arrow direction to pull the label 4. As illustrated in FIGS. 10B–10D, pulling force to the housing 3 is exerted to keep the housing 3 in contact with the wall members 40 and 41. The housing 3 is turned over behind the wall members 40 and 41 until the label 4 is peeled away at a high speed. In FIG. 10E, the housing 3 drops on the support tray 42 in such a direction that its front is directed upwards.

To pull the cut end 17a, there are other structures usable in the present invention. Instead of the peeler chuck 43, a pair of nip rollers can be disposed to nip the cut end 17a, and can be driven to pull the cut end 17a. Also a conveyor belt having an adhesive surface may be used to stick on the cut end 17a, to pull and peel it. Moreover a suction pipe can be used to pull the cut end 17a by use of suction air. The cut end 17a can be wound on a spindle and pulled by rotation of the spindle.

In the above embodiments, the article from which the label 4 is to be removed is the housing 3 of the lens-fitted photo film unit. The label 4 may be removed from a glass bottle, a PET bottle or other vessels to be recycled or reused. Such a bottle or vessels may be formed from any materials including plastic or glass. The label 4 may be removed from a vessel of any shapes, cylindrical, prismatic or the like. Such a vessel may have angular corners, and may have recesses or projections. In addition, a label may be removed from a cassette shell of a photo film cassette. Such a cassette shell may be formed from plastic material.

To peel the label from a vessel, it is possible to effect a pretreatment. For example, the label may be heated by a heater, or else immersed in hot water, aqueous solution of alkali or other suitable liquid, for the purpose of weakening the adhesion. If the label or the adhesive agent has a characteristic of coming to have weaker adhesion in response to ultraviolet rays or low temperature or high temperature, it is possible to apply ultraviolet rays to the label, or to apply hot or cool air to it. By the use of the pretreatment of those various types, peeling operation of the label is facilitated. Even if the label is pulled at the high speed, the label is prevented from being torn accidentally. Consequently the process time of one cycle of the operation can be shortened by increasing the pulling speed.

In attaching the label 4 to the housing 3, the adhesive agent is provided for the whole or edges of the back surface of the label 4. However adhesive agent may be provided in any of suitable partial regions predetermined on the back surface of the label 4, in consideration of various purposes.

In the above embodiments, the cut end of the label is moved away from the housing of the lens-fitted photo film unit. Alternatively the housing of the lens-fitted photo film unit may be forcibly pulled away from the cut end of the label while the cut end is held in a stationary manner.

In the above embodiment, the perforation train 19 is formed in the label 4 in a position offset from the straight groove 27 where the cutter cuts the label 4. Alternatively the perforation train 19 may formed in the label 4 in a position directly along the straight groove 27.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A label removing method of removing a label from an article, wherein said label is wound about said article in a belt-shape, and at least partially adhered to said article, said label removing method comprising the steps of:

cutting said label with a cutter in a predetermined cutting direction crosswise to a winding direction of said label, to form first and second cut ends on said label;

pushing open said first cut end away from said article with a spreader disposed downstream of said cutter; and after said first cut end is pushed open, engaging and moving said first cut end and said article relative to one another, so as to peel said label from said article.

2. A label removing method as defined in claim 1, wherein said article is a housing of a camera.

3. A label removing method as defined in claim 1, wherein said relative moving step includes pulling said first cut end from said article.

4. A label removing method as defined in claim 1, wherein said relative moving step includes pushing said first cut end away from said article in said winding direction.

5. A label removing method of removing a label from an article, wherein said label is wound about said article in a belt-shape, and at least partially adhered to said article, said label removing method comprising steps of:

cutting said label with a cutter in a predetermined cutting direction crosswise to a winding direction of said label, to form first and second cut ends on said label;

pushing open said first cut end away from said article with a spreader, said spreader being disposed to be offset rearwards from said cutter in said cutting direction, and to protrude in said winding direction from said cutter; and after said first cut end is pushed open, moving said first cut end and said article relative to one another, so as to peel said label from said article.

6. A label removing method as defined in claim 5, wherein said article is a housing of a camera.

7. A label removing method as defined in claim 5, further comprising steps of:

causing said label to contact said cutter; and conveying said article in said cutting direction relative to said cutter, so as to cut said label.

8. A label removing method as defined in claim 7, wherein said cutter and said spreader are constituted by a single knife blade;

said knife blade further includes a shank portion disposed to extend rearwards from said spreader in said cutting direction, at least said shank portion in said knife blade being flexed by said article when said cutter is pressed against said article.

9. A label removing method as defined in claim 8, wherein said cutter includes:

an advancing end, formed at a small width with reference to said winding direction, for passing between said label and said article in an advance position; and a cutting portion, disposed to extend rearwards from said advancing end in said cutting direction, and to protrude opposite to said spreader in said winding direction, having an inclined edge inclined relative to said cutting direction, for cutting said label in a cutting position, said cutting position being offset from said advance position.

10. A label removing method as defined in claim 9, wherein said advancing end is inclined toward said article with reference to said cutting portion.

11. A label removing method as defined in claim 10, wherein said label has a cut-designated line, disposed in said cutting position, and formed with a small strength to be easily cut.

12. A label removing method as defined in claim 11, wherein said article includes a substantially straight groove, formed to extend in said cutting direction, disposed in said advance position, for receiving insertion of said advancing end, to facilitate cutting of said label.

13. A label removing method as defined in claim 12, wherein said knife blade is shiftable between disengaged and engaged positions, and said advancing end, when shifted in said disengaged position, is away from said article, and when shifted in said engaged position, is pressed against said article and set at a predetermined angle with reference to said label.

14. A label removing method as defined in claim 5, wherein said relative moving step includes pulling said first cut end from said article.

15. A label removing method as defined in claim 5, wherein said relative moving step includes pushing said first cut end away from said article in said winding direction.

16. A label removing apparatus for removing a label from an article, wherein said label is wound about said article in a belt-shape, and at least partially adhered to said article, said label removing apparatus comprising:

a cutter for cutting said label in a predetermined cutting direction crosswise to a winding direction of said label, to form first and second cut ends on said label;

a spreader, disposed to be offset rearwards from said cutter in said cutting direction, and to protrude in said winding direction from said cutter, for pushing open said first cut end away from said article; and a peeler for moving said first cut end and said article relative to one another after said first cut end is pushed open, so as to peel said label from said article.

17. A label removing apparatus as defined in claim 16, wherein said article is a housing of a camera.

18. A label removing apparatus as defined in claim 16, further comprising a conveyor for conveying said article in said cutting direction relative to said cutter, so as to cut said label.

19. A label removing apparatus as defined in claim 18, wherein said cutter and said spreader are constituted by a single knife blade;

said knife blade further includes a shank portion disposed to extend rearwards from said spreader in said cutting direction, at least said shank portion in said knife blade being flexed by said article when said cutter is pressed against said article.

20. A label removing apparatus as defined in claim 19, wherein said cutter includes:

an advancing end, formed at a small width with reference to said winding direction, for passing between said label and said article in an advance position; and a cutting portion, disposed to extend rearwards from said advancing end in said cutting direction, and to protrude opposite to said spreader in said winding direction, having an inclined edge inclined relative to said cutting direction, for cutting said label in a cutting position, said cutting position being offset from said advance position.

21. A label removing apparatus as defined in claim 20, wherein said advancing end is inclined toward said article with reference to said cutting portion.

22. A label removing apparatus as defined in claim 21, wherein said label has a cut-designated line, disposed in said cutting position, and formed with a small strength to be easily cut.

23. A label removing apparatus as defined in claim 22, wherein said article includes a substantially straight groove, formed to extend in said cutting direction, disposed in said advance position, for receiving insertion of said advancing end, to facilitate cutting of said label.

24. A label removing apparatus as defined in claim 23, further comprising a shifter for supporting said shank portion, and for shifting said knife blade between disengaged and engaged positions, wherein said advancing end, when shifted in said disengaged position, is away from said article, and when shifted in said engaged position, is pressed against said article and set at a predetermined angle with reference to said label.

25. A label removing apparatus as defined in claim 16, wherein said peeler includes a chuck for capturing said first cut end, and for moving away from said article.

26. A label removing apparatus as defined in claim 25, wherein said peeler further includes first and second wall members, arranged adjacent to one another, between which said first cut end being pushed open is inserted, said first and second wall members regulating a position of said article;

wherein said chuck moves away from said first and second wall members while said first and second wall members prevent said article from moving in a moving direction of said chuck, whereby said label is peeled from said article being turned over.

27. A label removing apparatus as defined in claim 17, wherein said peeler includes a pusher member for pushing said first cut end away from said article in said winding direction.

28. A label removing apparatus as defined in claim 27, wherein said article further includes a notch, close to which said label is cut, which is uncovered at least partially by pushing open said first cut end, and through which said first cut end is pushed, to facilitate peeling of said label from said article.

29. A label removing apparatus as defined in claim 28, wherein said article has a substantially prismatic shape and has four side lines, and said notch lies on at least one of said four side lines.

30. A label removing method as defined in claim 8, wherein said knife blade includes:

first and second faces, positioned in reverse to each other, for opposing to respectively said label and said article; and plural grooves, formed in said first face, for preventing said first face from being stuck on said label.

31. A label removing method as defined in claim 19, wherein said knife blade includes:

first and second faces, positioned in reverse to each other, for opposing to respectively said label and said article; and plural grooves, formed in said first face, for preventing said first face from being stuck on said label.

\* \* \* \* \*